US007110575B2

(12) United States Patent
Chen et al.

(10) Patent No.: US 7,110,575 B2
(45) Date of Patent: Sep. 19, 2006

(54) METHOD FOR LOCATING FACES IN DIGITAL COLOR IMAGES

(75) Inventors: Shoupu Chen, Rochester, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 737 days.

(21) Appl. No.: 10/211,011

(22) Filed: Aug. 2, 2002

(65) Prior Publication Data

US 2004/0022423 A1 Feb. 5, 2004

(51) Int. Cl.
*G06K 9/00* (2006.01)
(52) U.S. Cl. ...................... 382/118; 382/164
(58) Field of Classification Search ............... 382/118, 382/164
See application file for complete search history.

(56) References Cited

U.S. PATENT DOCUMENTS

| | | | |
|---|---|---|---|
| 5,430,809 A | 7/1995 | Tomitaka | |
| 5,629,752 A | 5/1997 | Kinjo | |
| 5,835,616 A | 11/1998 | Lobo et al. | |
| 5,982,912 A | 11/1999 | Fukui et al. | |
| 6,421,463 B1 * | 7/2002 | Poggio et al. | 382/224 |
| 6,940,545 B1 * | 9/2005 | Ray et al. | 348/222.1 |
| 2001/0036298 A1 * | 11/2001 | Yamada et al. | 382/118 |
| 2002/0102024 A1 * | 8/2002 | Jones et al. | 382/225 |
| 2003/0108244 A1 * | 6/2003 | Li et al. | 382/227 |
| 2004/0013304 A1 * | 1/2004 | Viola et al. | 382/224 |
| 2005/0013479 A1 * | 1/2005 | Xiao et al. | 382/159 |

FOREIGN PATENT DOCUMENTS

WO    WO 99/23600 A    5/1999

OTHER PUBLICATIONS

Liu, Z; Wang, Y; "Face Detection and Tracking in Video Using Dynamic Program", International Conference on Image Processing Proceedings, vol. 1 p. 53-56, 2000.*
Yang et al., "Human Face Detection in a Complex BAckground", Pattern Recognition, vol. 27, No. 1, 1994, pp. 53-63.*
Viola et al., "Robust Real-time Object Detection", Second International Workshop on Statistical and Computational Theories of Vision, Jul. 2001, pp. 1-25.*
Zhu et al., "A Cascaded Face Detection Framework", Signal and Image Processing, 2003.*
Wang, "A Highly Efficient System for Automatic Face Region Detection in MPEG Video", IEEE Transactions on Circuits and Systems for Video Technology, vol. 7 No. 4, Aug. 1997.*
Sobottka et al., "Face Localization and Facial Feature Extraction Based on Shape and Color Information", IEEE, 1996.*

(Continued)

*Primary Examiner*—Jingge Wu
*Assistant Examiner*—Jordan Kuhn
(74) *Attorney, Agent, or Firm*—Thomas H. Close

(57) ABSTRACT

A digital image processing method for locating faces in a digital color image includes the steps of: generating a mean grid pattern element (MGPe) image from a plurality of sample face images; generating an integral image from the digital color image; and locating faces in the color digital image by using the integral image to perform a correlation between the mean grid pattern element (MGPe) image and the digital color image at a plurality of effective resolutions by reducing the digital color image to grid pattern element images (GPes) at different effective resolutions and correlating the MGPe with the GPes.

23 Claims, 15 Drawing Sheets

OTHER PUBLICATIONS

Sung et al., "Example-Based Learning for View-Based Human Face Detection", IEEE Transactions on Pattern Analysis and Machine Intelligence, vol. 20 No. 1, Jan. 1998.*

Turk et al., "Eigenfaces for Recognition", Journal of Cognitive Neuroscience, vol. 3 No. 1, 1991.*

Ando et al., "Human Face Detection and Recognition using Principle Coponent Analysis", Hiroshima University, 2003.*

Saber et al., "Face Detection an Facial Feature Exrtraction Using Color, Shape and Symmetry-Based Cost Function", Proceedings of ICPR '96, 1996.*

Anderson, T. W., The Statistical Analysis of Time Series, Chapter 6: *Serial Correlation*, Wiley-Interscience Publication, 1994, pp. 254-357.

Viola et al., Robust Real-time Object Detection, Second International Workshop on Statistical and Computational Theories of Vision, Jul. 2001, pp. 1-25.

Yang et al., Human Face Detection in a Complex Background, *Pattern Recognition*, vol. 27, No. 1, 1994, pp. 53-63.

Zhu Liu et al.: "Face Detection and Tracking In Video Using Dynamic Programming", Image Processing, 2000, Proceedings. 2000, International Conference On Sep. 10-13, 2000, Piscataway, NJ, USA, IEEE, vol. 1, Sep. 10, 2000, pp. 53-56, XP010530548, ISBN: 0-7803-6297-7.

* cited by examiner

METHOD FOR LOCATING FACES IN DIGITAL COLOR IMAGES

FIELD OF THE INVENTION

The present invention relates to digital image processing methods for automatically locating human faces in digital images.

BACKGROUND OF THE INVENTION

In digital image processing, in particular, image processing for the purpose of enhancing and optimizing the process of images capture by a camera, it is often useful to automatically detect human faces. Applications of face detection include face recognition, image beautification, image scene balancing, image retrieval, security surveillance and person identification.

A preponderance of images collected by photographers contain human facial images, which are often the most important subjects of the images. Knowledge of the presence and location of faces in an image, and especially the presence and location of the faces, could enable many beneficial improvements to be made in the image capture process. Some are suggested in the prior art. For example, automatic and semi-automatic focusing cameras often pick a portion of the scene on which to adjust for best focus. If the camera could locate the faces in a scene, then focus could be optimized for the faces unless the photographer explicitly overrides that choice. In U.S. Pat. No. 5,835,616 issued Nov. 10, 1998 to Lobo et al., a face detection system is used in automated photography to eliminate manual adjustment problems that can result in poor quality from lack of focused subjects.

Furthermore, detection of the faces in a scene gives very strong evidence of the proper location of the principal subject matter. In that connection, the process disclosed in the '616 patent automatically finds a human face in a digitized image taken by a digital camera, confirms the existence of the face by examining facial features and then has the camera automatically center itself on the detected face. Detection of a face also yields strong evidence of proper color balance for the facial and/or skin area. For example, in U.S. Pat. No. 5,430,809 issued Jul. 4, 1995 to Tomitaka, a video camera autonomously tracks a facial target in order to set a measuring frame on the facial object for purpose of auto exposure and auto focus. In addition, once the measuring frame is set, an auto white balance system adjusts colors to obtain optimal skin color on the face. As a result, the auto white balance system is said to perform auto skin color balance. It is also known (from U.S. Pat. No. 5,629,752 issued May 13, 1997 to Kinjo) to detect a human face and then to utilize data representing color and/or density of the facial region to determine an exposure amount such that the region corresponding to the face can be printed appropriately by a photographic printer.

A great amount of research efforts has been spent on proposing a wide variety of face detection techniques. Face detection is defined as locating the existence of a face in an image. Face recognition on the other hand is defined as assigning an identity to a detected face. Face detection is often a precursor to face recognition. In general, prior art face detection techniques can be classified as either feature-based or region-based. The techniques in the feature-based category first derive low level features such as edges and then use face knowledge-based analysis to find face candidates in an image. The apparent properties of the face such as skin color and face geometry are exploited at different system levels in this category. Feature-based approaches have dominated the face detection research interest for quite a long period before the recent shift of interest to using pattern recognition theory in face detection. It is worth noting that the main components used in the feature-based techniques are edges that come from a high frequency portion of the image and, in general, are not as stable as components from the low frequency portion. Also, in using skin color for face detection, most techniques employ carefully designed skin color models in order to achieve high skin detection accuracy with very low false positives. However, skin color models having a high degree of accuracy often tend to exclude skin colors falling outside of the majority skin color region upon which skin color models are built. The exclusion of non-majority skin colors, in turn, results in face detection failures.

In recent years, benefiting from the advances in pattern recognition theory, techniques in the region-based category treat face detection as a pattern recognition problem without the application of face knowledge. The performance of the methods in this category solely relies on the quality of a classifier trained by learning examples from face class and non-face class training images. The number of samples of face and non-face (or the variation of training images) used in the training process largely determines the effectiveness of the classifier. More training images result in better classifiers. It is a commonly accepted understanding that the number of face training images may have a limit, the number of non-face training images has no limits. Thus, repeated training is not uncommon for techniques in this category. Huge footprints (memory spaces required to store trained classifier information in a computer to do the face detection task) may result, which may become a problem for applications with limited computing resources. It should also be noted that face structural (geometry) information is basically not used in techniques in this category.

While face detection has been studied over the past several years in relation to the subject of image understanding, it remains an area with impressive computational requirements, particularly if a robust face detection algorithm is needed. A number of methods have been devised that show reasonable performance over a range of imaging conditions. For example, in a recent article, "Human Face Detection in A Complex Background", published in Pattern Recognition, Vol. 27, No. 1, pp. 53–63, 1994, Yang et al. proposed a hierarchical knowledge-based method to locate human faces in an image. Such methods may be more successfully implemented in large scale processing equipment, such as photographic printers, which have relatively sophisticated processing capability (compared to a hand-held camera). The challenge is to implement these face detection methods reasonably in a camera with limited memory resources, and with low computational cost (rapid execution). If this can be done successfully, the detection of faces in a scene will then serve as a springboard to numerous other improvements in the image capture process. In addition, it would be useful to detect faces in order to implement downstream activities after image capture, e.g., face detection could provide evidence of up/down orientation for subsequent printing (for example, of index prints).

There is a need therefore for an improved face detection method that overcomes the problems set forth above.

These and other aspects, objects, features and advantages of the present invention will be more clearly understood and appreciated from a review of the following detailed description of the preferred embodiments and appended claims, and by reference to the accompanying drawings.

SUMMARY OF THE INVENTION

The need is met according to the present invention by providing a digital image processing method for locating faces in a digital color image that includes the steps of: generating a mean grid pattern element (MGPe) image from a plurality of sample face images; generating an integral image from the digital color image; and locating faces in the color digital image by using the integral image to perform a correlation between the mean grid pattern element (MGPe) image and the digital color image at a plurality of effective resolutions by reducing the digital color image to grid pattern element images (GPes) at different effective resolutions and correlating the MGPe with the GPes.

Advantages

The present invention has the advantages of rapid execution and requiring very little memory space.

DETAILED DESCRIPTION OF THE INVENTION

Figure 1:
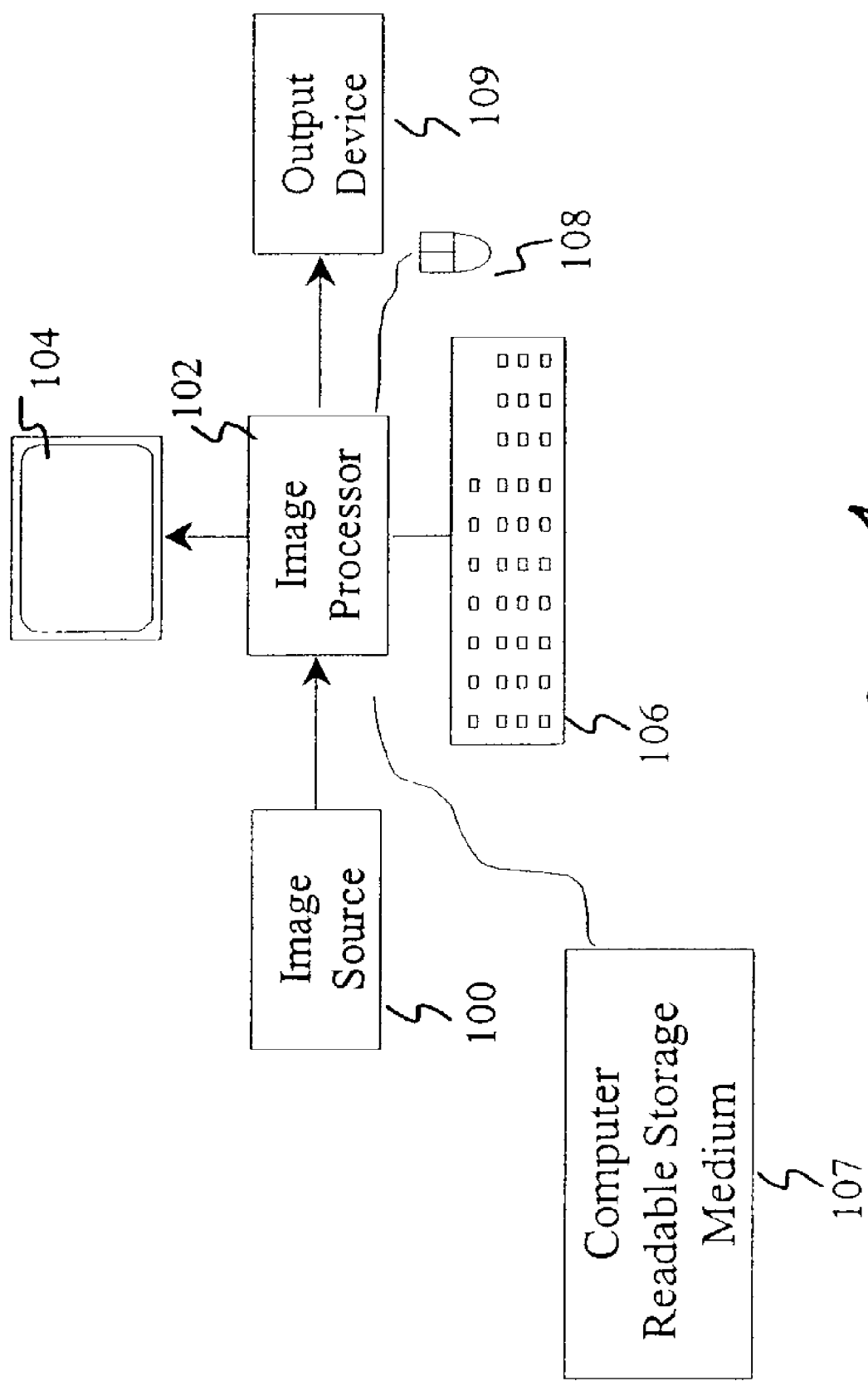
FIG. 1 is a schematic diagram of an image processing system useful in practicing the present invention.

FIG. 1, shows an image processing system useful in practicing the present invention including a color digital image source 100, such as a film scanner, digital camera, or digital image storage device such as a compact disk drive with a Picture CD. The digital image from the digital image source 100 is provided to an image processor 102, such as a programmable personal computer, or digital image processing work station such as a Sun Sparc workstation. The image processor 102 may be connected to a CRT display 104, an operator interface such as a keyboard 106 and a mouse 108. Image processor 102 is also connected to computer readable storage medium 107. The image processor 102 transmits processed digital images to an output device 109. Output device 109 can comprise a hard copy printer, a long-term image storage device, a connection to another processor, or an image telecommunication device connected, for example, to the Internet.

In the following description, a preferred embodiment of the present invention will be described as a method. However, in another preferred embodiment, the present invention comprises a computer program product for detecting human faces in a digital image in accordance with the method described. In describing the present invention, it should be apparent that the computer program of the present invention can be utilized by any well-known computer system, such as the personal computer of the type shown in FIG. 1. However, many other types of computer systems can be used to execute the computer program of the present invention. For example, the method of the present invention can be executed in the computer contained in a digital camera. Consequently, the computer system will not be discussed in further detail herein.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Other aspects of such algorithms and systems, and hardware and/or software for producing and otherwise processing the images involved or co-operating with the computer program product of the present invention, are not specifically shown or described herein and may be selected from such algorithms, systems, hardware, components, and elements known in the art.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the Internet or other communication medium. Those skilled in the art will readily recognize that the equivalent of such a computer program product may also be constructed in hardware.

Figure 2:
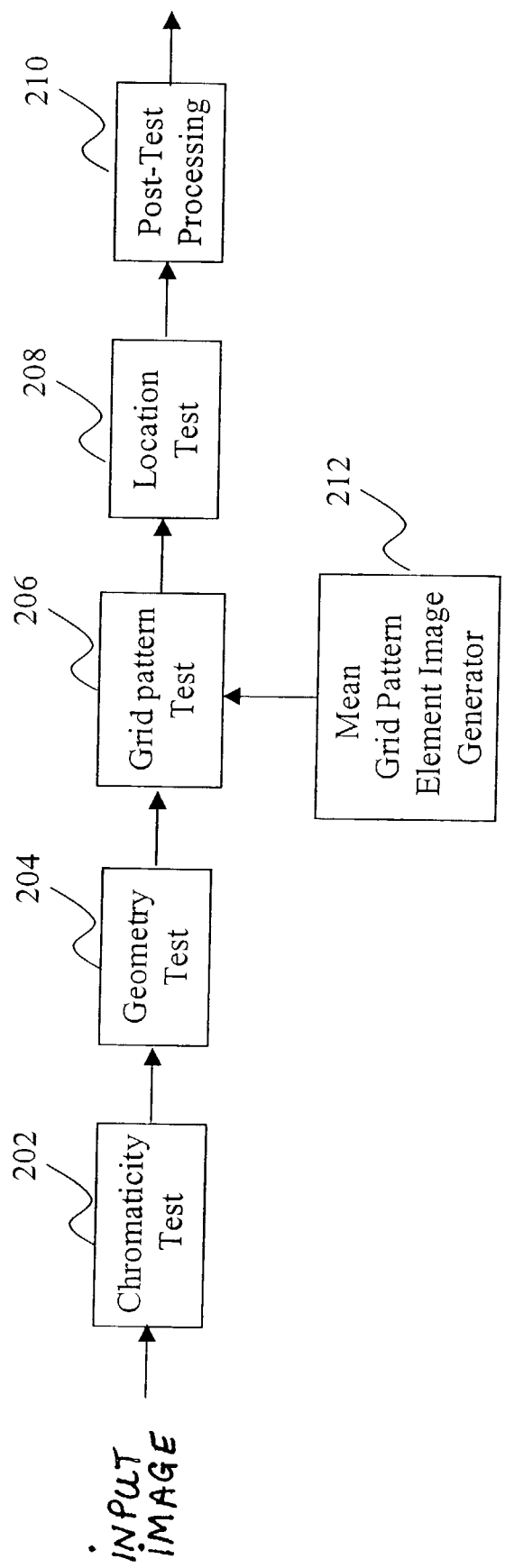
FIG. 2 is a flowchart illustrating the face detection method of the present invention.

Turning now to FIG. 2, the method of the present invention will be outlined. FIG. 2 is a flow chart illustrating one embodiment of the face detection method of the present invention. In the embodiment shown in FIG. 2, an input color digital image goes through a set of cascaded tests. Each of these tests discards non-face objects with high confidence and retains most faces. The idea is to maintain a very high true-positive detection rate in every cascaded test while keeping a relatively low false-positive rate for individual tests. Since tests are cascaded, an overall performance of high true-positive and low false-positive rates is achieved. In the present invention, face detection tasks are distributed to different types of tests. This distributed system approach reduces the burden on each individual test, thereby speeding up the detection process.

In the embodiment shown in FIG. 2, there are basically four cascaded tests. A chromaticity test 202 discards, with high confidence, non-skin-color pixels in the input digital color image. This chromaticity test is different from the traditional skin color detection methods. In using a color property for face detection, most skin color detection techniques employ carefully designed skin color models in order to achieve high skin detection accuracy with very low false positives. However, skin color models having a high degree of accuracy often tend to exclude skin colors falling outside of the skin color region of a majority population upon which skin color models are built. The exclusion of non-majority skin colors, in turn, results in face detection failures. This chromaticity test, instead, focuses on exclusion of non-skin-colors with high accuracy. For example, it discards (sets to black) saturated green, or saturated blue pixels, and keeps pixels having colors close to skin-colors of all hues. Therefore, it does not reject skin color pixels of non-majority populations.

The chromaticity test 202 is followed by a geometry test 204. Pixels retained in the chromaticity test step 202 are grouped into regions (or clusters of pixels). These regions are checked to see if they pass a geometry test. Only those regions that pass the test will be allowed to enter a subsequent statistical test, that is, a grid pattern test 206 all other pixels are set to black. The geometry test 204 basically checks a region's geometry shape, size, and location.

After the first two tests (chromaticity test 202 and geometry test 204), regions (or clusters of pixels) possibly containing faces remain and are further checked to locate actual positions of faces. The grid pattern test 206 performs the task of locating actual faces with the help of a mean grid pattern element image that is formed in a mean grid pattern element image generator 212. The grid pattern test 206 performs a similarity check by evaluating a correlation coefficient between the mean grid pattern element image and a grid pattern element image converted from a sub-image that is cropped from the remaining regions obtained from the geometry test step 204. Sub-images that pass the grid pattern test are marked as candidate faces. Some candidates may reside partially in regions discarded in the geometry test step 204.

All candidates are subsequently checked in a location test 208. Candidates residing partially in regions discarded in the geometry test step 204 are unmarked in the location test step 208. The grid pattern test 206 is performed on the image in a raster scan fashion. With the raster scanning, it may result in multiple candidates very close to each other in terms of position for the same face. Post-test processing 210 is then performed to combine closely spaced multiple candidates into a single candidate based on a distance measure.

Figure 4:
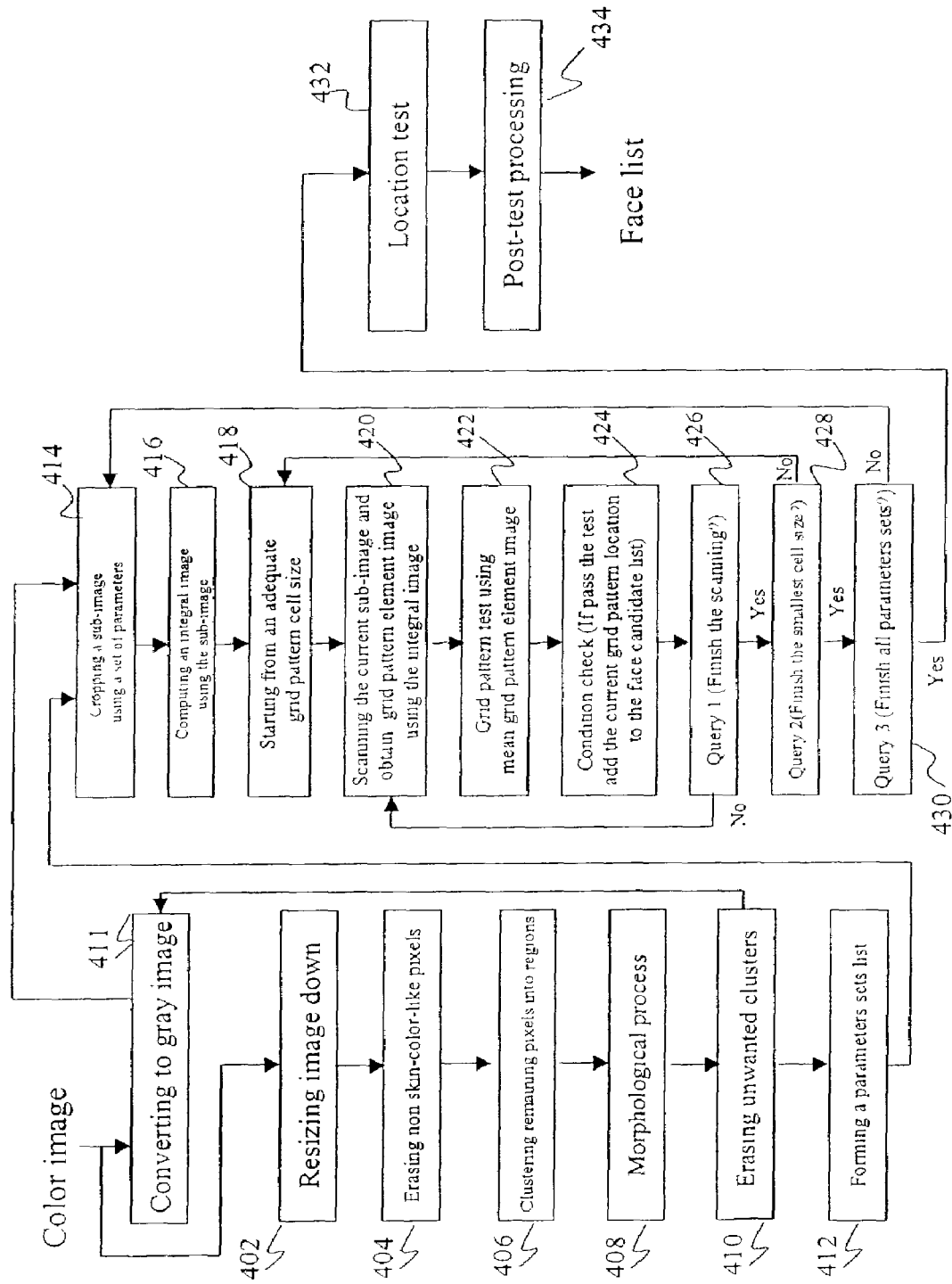
FIG. 4 is a flowchart illustrating a detailed process of face detection according to the present invention.
Figure 12B:
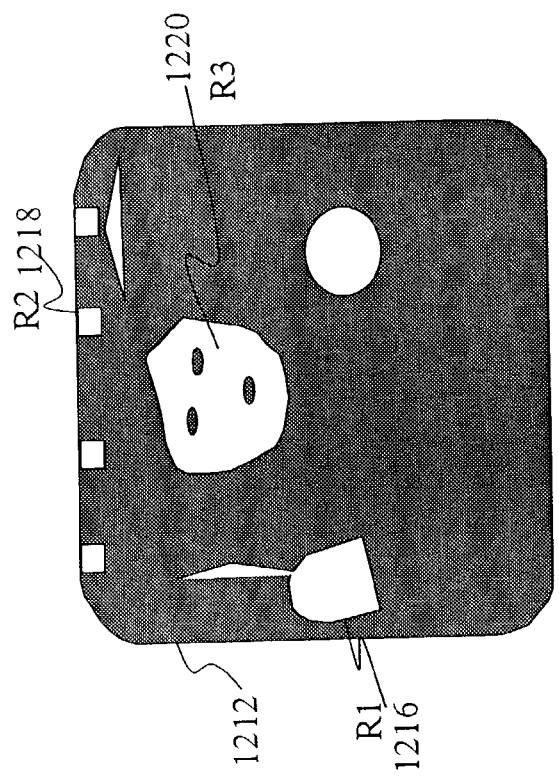
FIGS. 12A, B, C and D are illustrations useful in describing an image, a skin test, a geometry test, and the definition of a box for a skin color cluster, respectively.
Figure 12A:
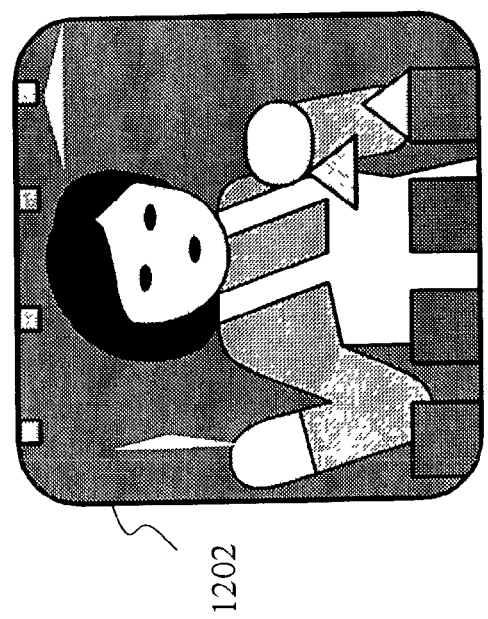
Figure 12D:
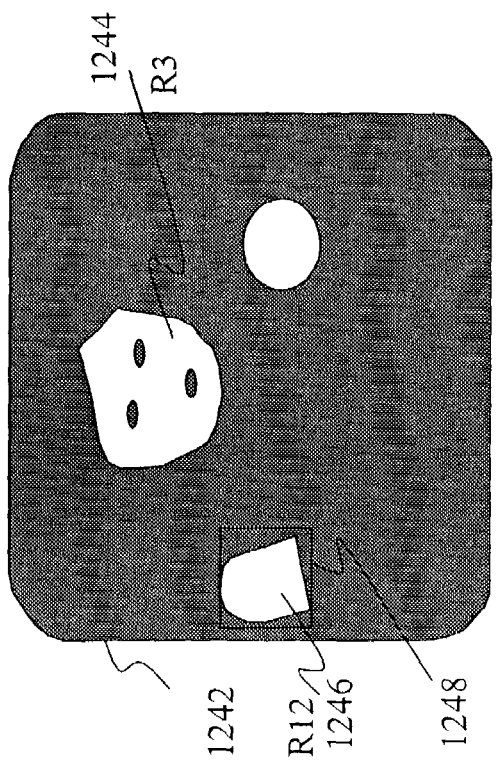
Figure 12C:
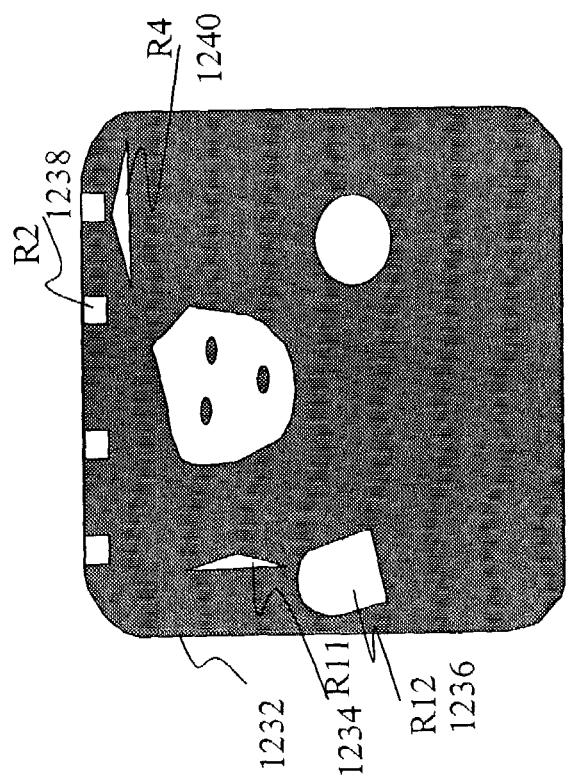

Referring now to FIG. 4, the method of the present invention will be described in greater detail. FIG. 4 is a flow chart illustrating finer steps of what is shown in FIG. 2. In the embodiment shown in FIG. 4, an input image having a standard size may first be resized downward in a resizing image down step 402. This step is optional to increase the processing speed of the method. An exemplary standard size input image could be 384×256. An exemplary resizing factor is 4. The purpose of resizing downward of the input image is to speed up the processes of the chromaticity test and geometry test. The resized color image is processed in an erasing non-skin-color pixels step 404 (referred to as a chromaticity test 202 in FIG. 2), to get rid of non-skin-color pixels. The non-skin color pixels are set to black. Unlike traditional skin color detection algorithms, this chromaticity test has no color space conversion and skin color modeling. In the present invention, if a pixel satisfies a set of conditions, it will be marked as a non-skin-color pixel. The erasing procedure and associated exemplary conditions are described by a piece of pseudo code in Equation (1) where rowsnew and colsnew are the height and width of the resized image; r, g, b are three color components of a pixel, Rgratio1, Rbratio1, Rgratio2, and Rbratio2 are predefined coefficients. Exemplary values for these coefficients could be Rgratio1=1.1, Rbratio=1.1, Rgratio2=3.5, and Rbratio2=5.0. These coefficients can be determined empirically by examining a large quantity of sample images. If a pixel meets the conditions, the pixel is set to black. FIGS. 12A–D show an example of a chromaticity test. In FIG. 12A, there is an intensity color image 1202. In FIG. 12B, there is a first binary image 1212 that is the result after applying Equation (1) to the intensity image 1202. In the first binary image 1212, a pixel in dark represents a non-skin-color pixel in the intensity image 1202, while a pixel in white represents a skin-color pixel in the intensity image 1202.

```
for(i = 0; i < rowsnew * colsnew; i ++){                           (1)
    if(r[i] < Rgratio1 * g[i] || r[i] < Rbratio1 * b[i])
       || r[i] < Rt || g[i] < Gt || b[i] < Bt || r[i] > RGratio2 * g[i]||
       r[i] > RBratio2 * b[i] {
       g[i] =0;
    }
}
```

Now, referring back to FIG. 4, there are three steps (step of clustering remaining pixels into regions 406, step of morphological process 408, and step of erasing unwanted regions 410) responsible for implementing a geometry test 204. To better explain the test operation, example images in FIG. 12B and C are referred to. An input image to the step of clustering remaining pixels into regions 406 is a binary image obtained from the chromaticity test 202 in FIG. 2 (or the step of erasing non-skin-color pixels 404 in the more detailed flow chart shown in FIG. 4). An example binary image is shown in the upper right part of FIG. 12B. Non-zero pixels in the first binary image 1212 are grouped into clusters. By definition, a cluster is a non-empty set of non-black pixels with the property that any pixel within the cluster is also within a predefined distance to another pixel in the cluster. An exemplary predefined distance is 1. Example clusters in the first binary image 1212 are cluster R1 (1216), cluster R2 (1218), and cluster R3 (1220). An interesting point is that cluster R1 (1216) is a combination of two barely touching clusters. After applying a morphological process 408 to pixels clusters, cluster R1 (1216) in the binary image 1212 breaks into two clusters R11 (1234) and R12 (1236) in a second binary image 1232. A preferred morphological process is a closing operation.

A final step in geometry test 204 is an erasing unwanted clusters step 410. Unwanted clusters are those clusters satisfying one or more of the following conditions. A maximum width of a cluster is smaller than a predefined minimum width. A maximum height of a cluster is smaller than a predefined minimum height. A center of a cluster is within a minimum margin of the image boundary. An exemplary predefined minimum width is 3 for the resized image. An exemplary predefined minimum height is 3 for the resized image. An exemplary predefined minimum margin is 3 for the resized image. Examples of clusters to be erased are cluster R2 1238, cluster R11 1234 and cluster R4 1240 in the second binary image 1232 in FIG. 12. The result of the erasing unwanted clusters 410 is a third binary image 1242 shown in FIG. 12. Examples of remaining clusters are R3 1244 and R12 1246.

Referring to FIG. 2, the step after the geometry test 204 is the grid pattern test 206. The grid pattern test 206 starts from a step of cropping a sub-image using a set of parameters 414 to a step of query 3 430 in FIG. 4. An intensity image to be used in the grid pattern test 206 is a gray scale image converted from the original color image in a step of converting to gray image 411 shown in FIG. 4. The parameters used in the cropping a sub-image step 414 are generated in a step of forming parameters sets list 412. A set of parameters contains a width, a height, and positions of an upper left corner of a rectangular box. The width of the box is a maximum width of a cluster retained in the geometry test step 204. The height of the box is a maximum height of a cluster retained in the geometry test step 204. An example of such a box is a box 1248 shown in FIG. 12D. The positions of the upper left corner of the box are defined with respect to the upper left corner of the binary image 1242. It should be understood that these parameters are re-scaled to fit the original image size before they are used to crop a sub-image from the gray scale image in the step of cropping a sub-image step 414.

Figure 3A:
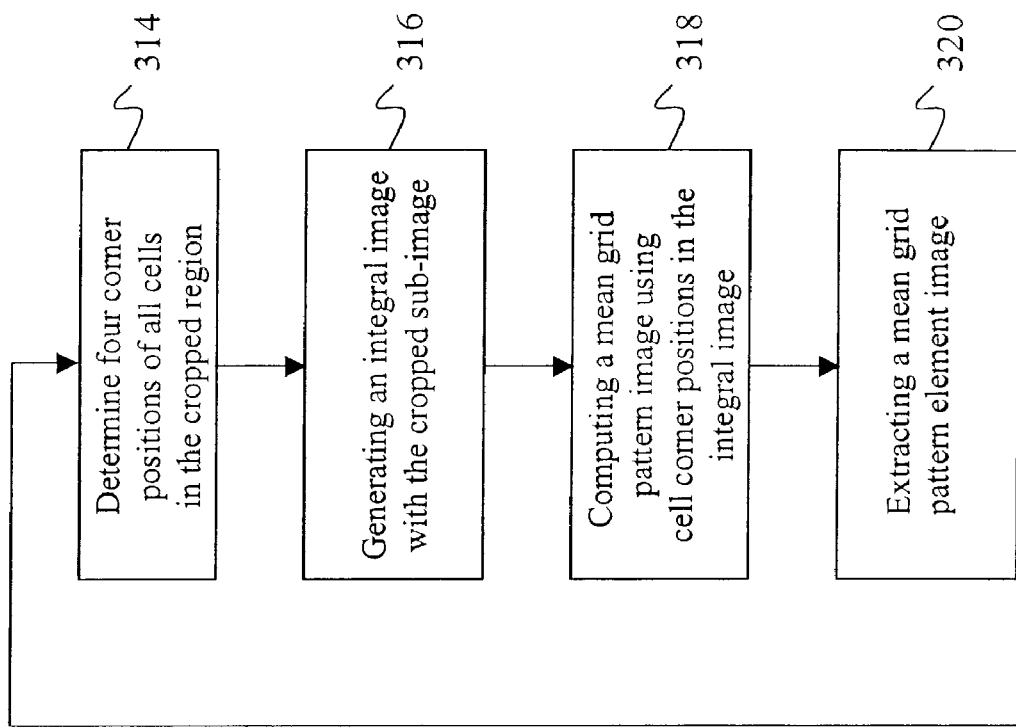
FIG. 3A is a flowchart illustrating a method of irregular grid pattern design.
Figure 3A:
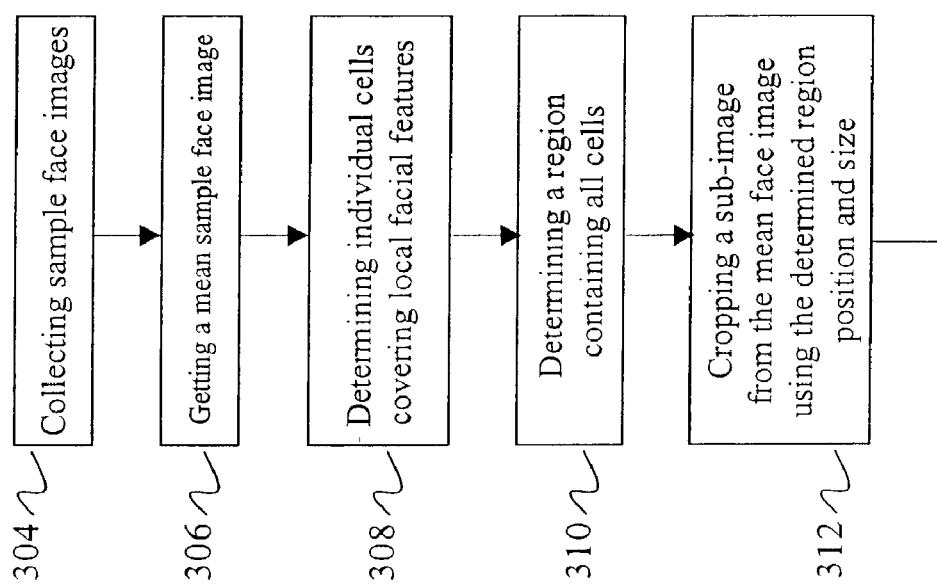
Figure 5:
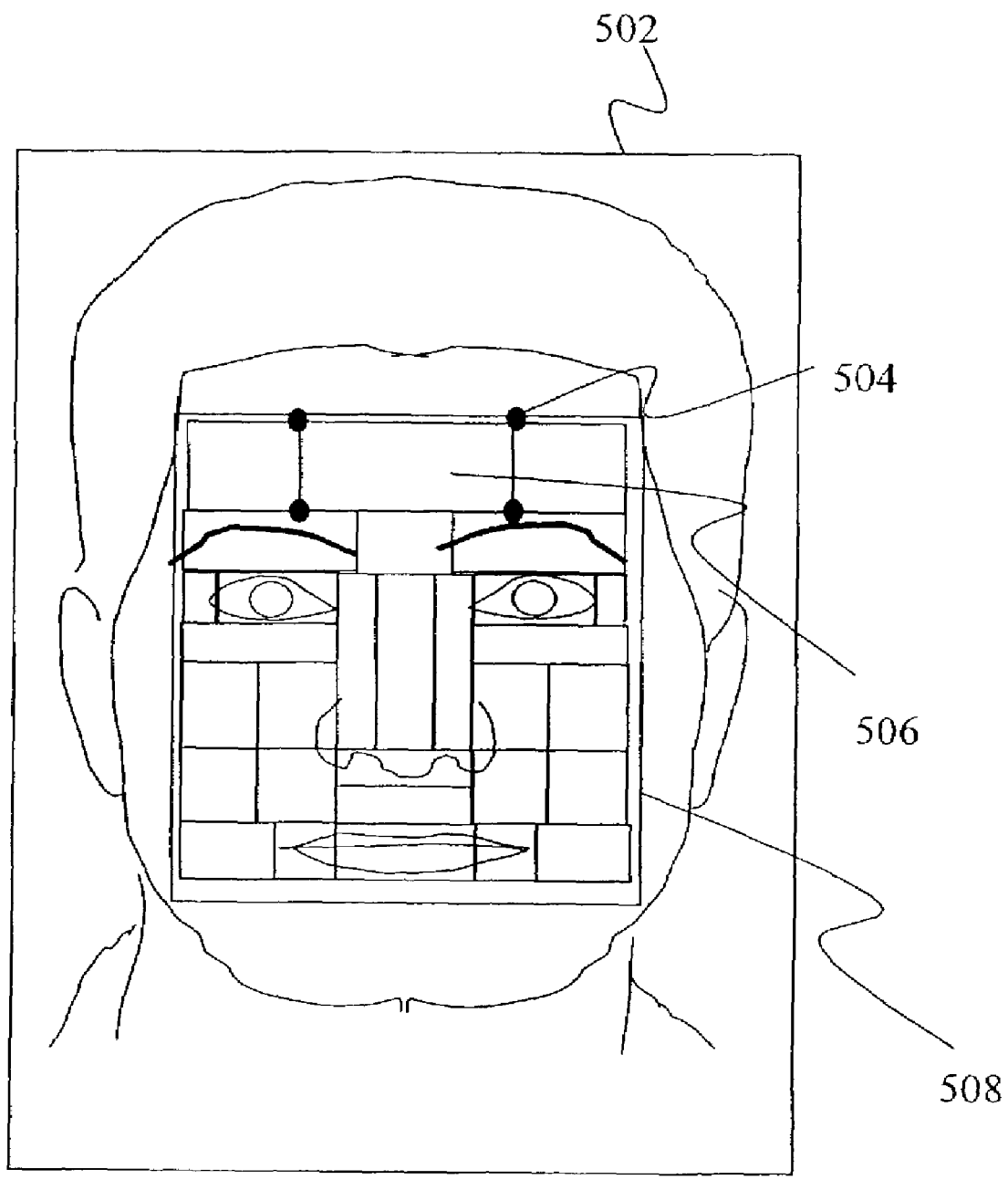
FIG. 5 is an illustration showing an irregular grid pattern.

The grid pattern test step 206 uses a mean grid pattern element (MGPe) image generated in a step of mean grid pattern element image generator 212. There are two designs for generating an MGPe image. Design 1 is a generalized design. Design 2 is a special case of design 1. Steps of design 1 are described in FIG. 3A. A first step in design 1 is a step of collecting sample face images 304. A large amount of cropped face images are manually collected. In a step of getting a mean face image 306, a mean face image is obtained by aligning two eyes of all the collected face images and taking average intensity for every pixel. To generate an MGPe image, grid cell sizes and positions are determined. In design 1, cells have different sizes and each one of them covers a specific area of the face cluster (step of determining individual cells covering local facial features 308). An example cell design 1 is shown in FIG. 5.

Figure 11B:
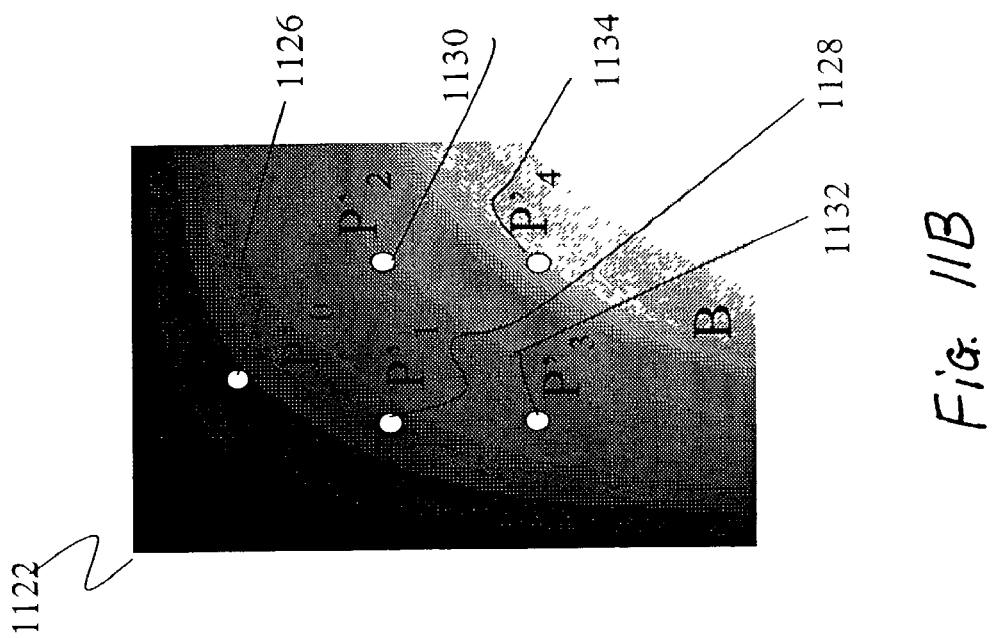
FIGS. 11A and B illustrate an intensity image and its associated integral image.
Figure 11A:
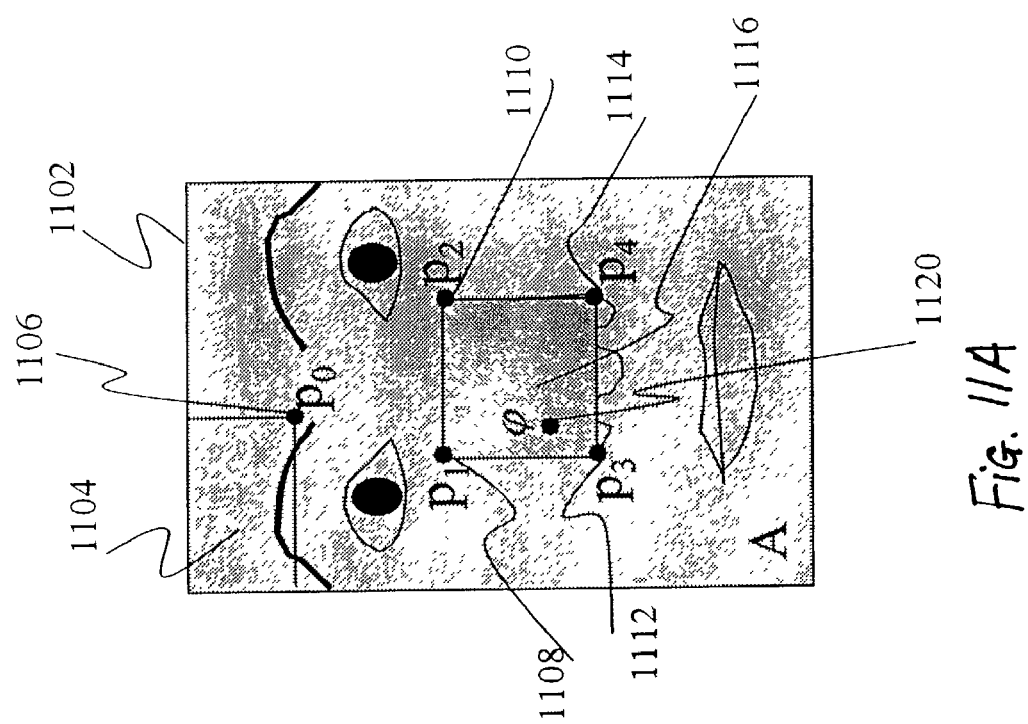

In a face image 502, there is a cell 506 covering the forehead area. Other examples of cell design 1 can also be seen in FIG. 5. A smallest box that contains all the cells is determined in a step of determining a box containing all cells 310. An example box 508 forming a cluster boundary is shown in FIG. 5. Using this box, a sub-image of the mean face image can be obtained in a step of cropping a sub-image step 312. Four corner dots such as an upper right corner dot 504 of the cell 506 are thereby calculated with respect to the upper left corner of the sub-image in a step of determining four corner positions step 314. An efficient approach to compute a mean grid pattern element image is to use an integral image; see "Robust Real-time Object Detection", by Paul Viola et al., Second International Workshop on Statistical and Computational Theories of Vision, Jul. 13, 2001, pp. 1–25, which is incorporated herein by reference). An example of calculating the integral image is shown in FIGS. 11A and B. In FIG. 11A, image A (1102) is a gray level intensity image and in FIG. 11B, image B (1122) is an integral image of image A (1102). The integral image has the same size as the mean face intensity image A. The computation of a pixel at position 1126 corresponding to a position 1106 in the image A in FIG. 11A in integral image B (1122) is $$B(p'_0) = \sum_{\|p_i\| \le \|p_0\|} A(p_i) \qquad (2)$$

where $A(p_i)|_{\|p_i\| \le \|p_0\|}$ defines a region 1104 in the mean face image 1102. $p_i$ is a vector in the two dimensional image plane which has an origin at the upper left corner. In the above case, $p_0 = p'_0$. In practice, Equation (2) is replaced by a pair of recurrences introduced in Viola's paper for speedy computation.

After obtaining an integral image in a step of generating an integral image with the cropped sub-image 316, a mean grid pattern image is computed in a step of computing a mean grid pattern image using cell corner positions in the integral image 318. It should be understood that the mean grid pattern image is different from the mean grid pattern element image. The mean grid pattern image has the same size as the mean face intensity image. The mean grid pattern element image is extracted 320 from the mean grid pattern image. Now referring back to FIG. 11, there is a cell 1116 defined by four corner points $p_1$ (1108), $p_2$ (1110), $p_3$ (1112), and $p_4$ (1114). This cell covers a nose area of the mean face image. This cell also represents a cell in the same position in the mean grid pattern image to be computed from the mean face image. The computation of any pixels in this cell for the mean grid pattern image is expressed as $$\varphi = \frac{1}{mn}(B(p'_4) + B(p'_1) - B(p'_2) - B(p'_3))|_{\varphi \in \Phi[p_1, p_2, p_3, p_4]} \qquad (3)$$

where $\Phi[p_1, p_2, p_3, p_4]$ is the cell defined by four corner points $p_1$ (1108), $p_2$ (1110), $p_3$ (1112), and $p_4$ (1114) in the grid pattern image, $\varphi$ is any pixel in cell $\Phi[p_1, p_2, p_3, p_4]$, $B(p'_x)$ is the pixel value at positions $p'_x$ (they are $p'_1$ 1130, $p'_3$ 1132, and $p'_4$ 1134) in the integral image (here, $p_1 = p'_1$, $p_2 = p'_2$, $p_3 = p'_3$, and $p_4 = p'_4$), m is the cell height and n is the cell width. Since all pixels in a cell have a same value, only one pixel for each cell (for example, $\varphi$ 1120 for the nose cell 1116 in FIG. 11) is needed to construct the mean grid pattern element image. For design 1, the format of the mean grid pattern element image could be a one dimensional image or a two dimensional image. A preferred format is the one dimensional image. For constructing the mean grid pattern element image, simply copy one pixel from each of the cells of the mean grid pattern image to a pixel in the mean grid pattern element image in an order. The number of pixels in the mean grid pattern element (MGPe) image equals the number of cells in the mean grid pattern image. The order of pixel copying process for this operation needs to be recorded so that in the grid pattern test step 206 the same order can be used to form a grid pattern element image for images under testing if design 1 is selected.

It is understood that since the mean grid pattern element (MGPe) image takes only one pixel from each of the cells, statistically, the size of the cropped sub-image (thereby, size of individual cells) should not matter. The MGPe image is simply a statistical measure of main features of a mean face. Practically, an exemplary size for the cropped sub-image for generating an MGPe image could be 105×105.

Figure 3B:
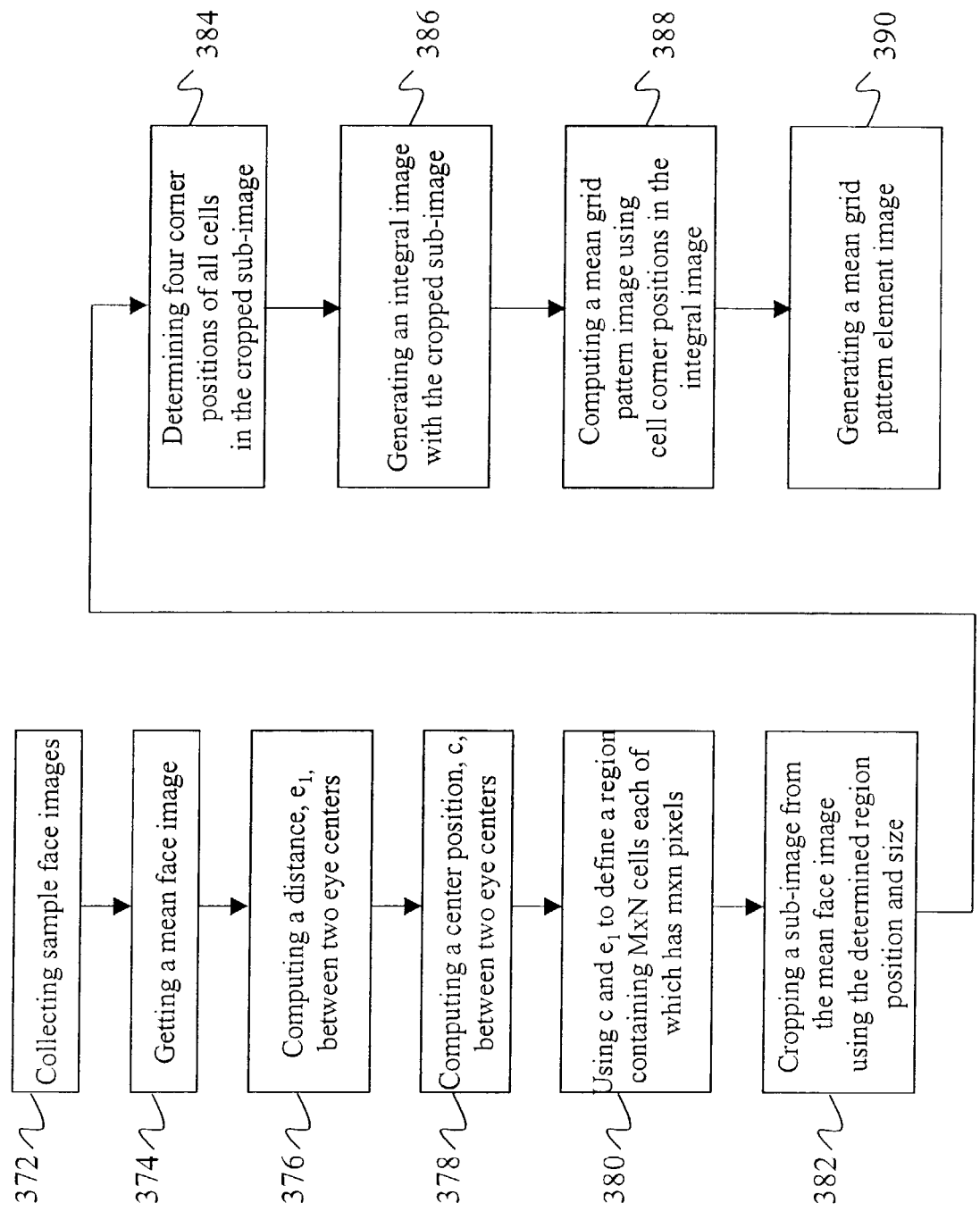
FIG. 3B is a flowchart illustrating a method of regular grid pattern design.
Figure 6:
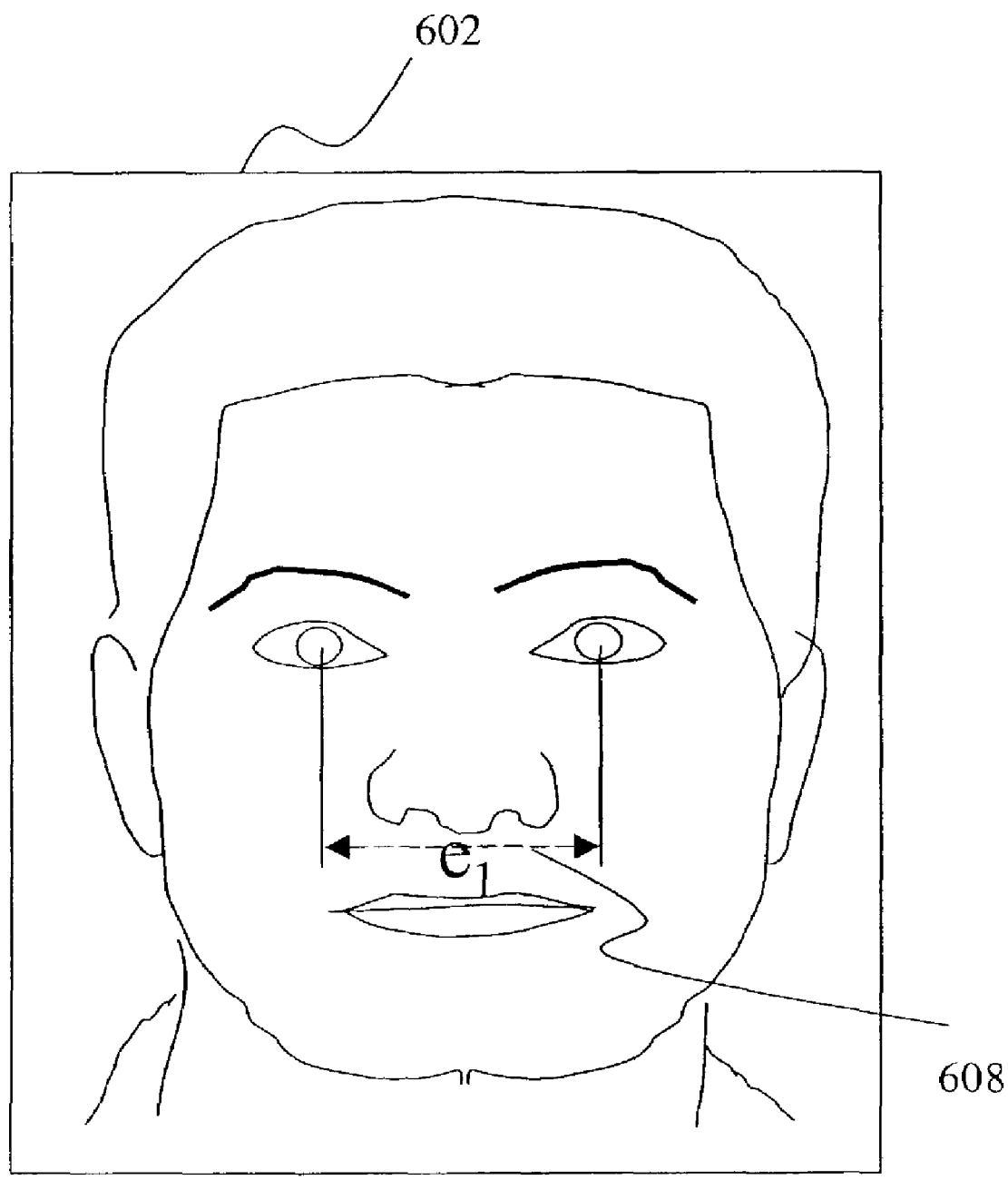
FIG. 6 is an illustration showing key positions for regular grid pattern design.
Figure 7:
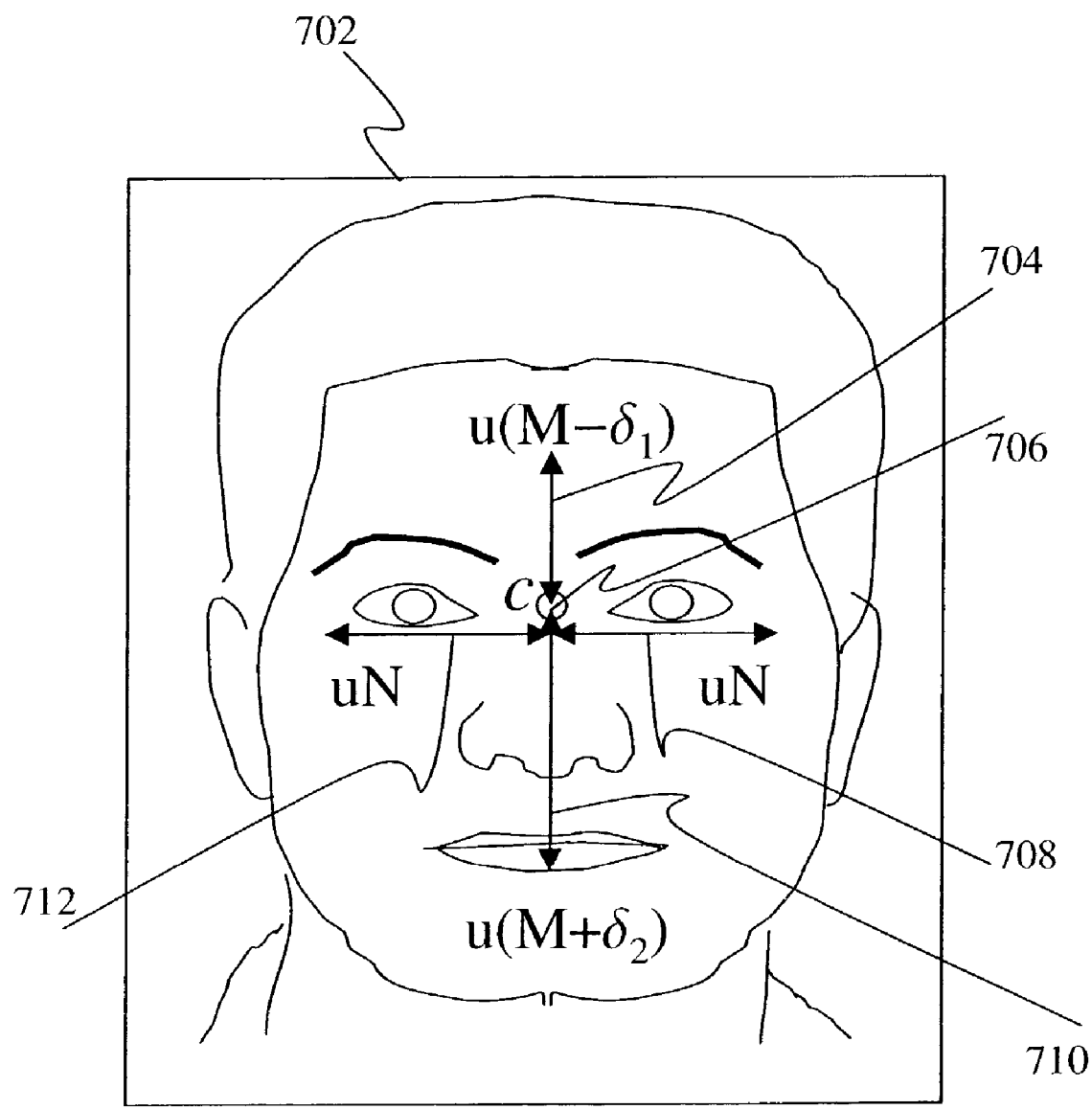
FIG. 7 is an illustration showing position and size parameters for regular grid pattern design.
Figure 8:
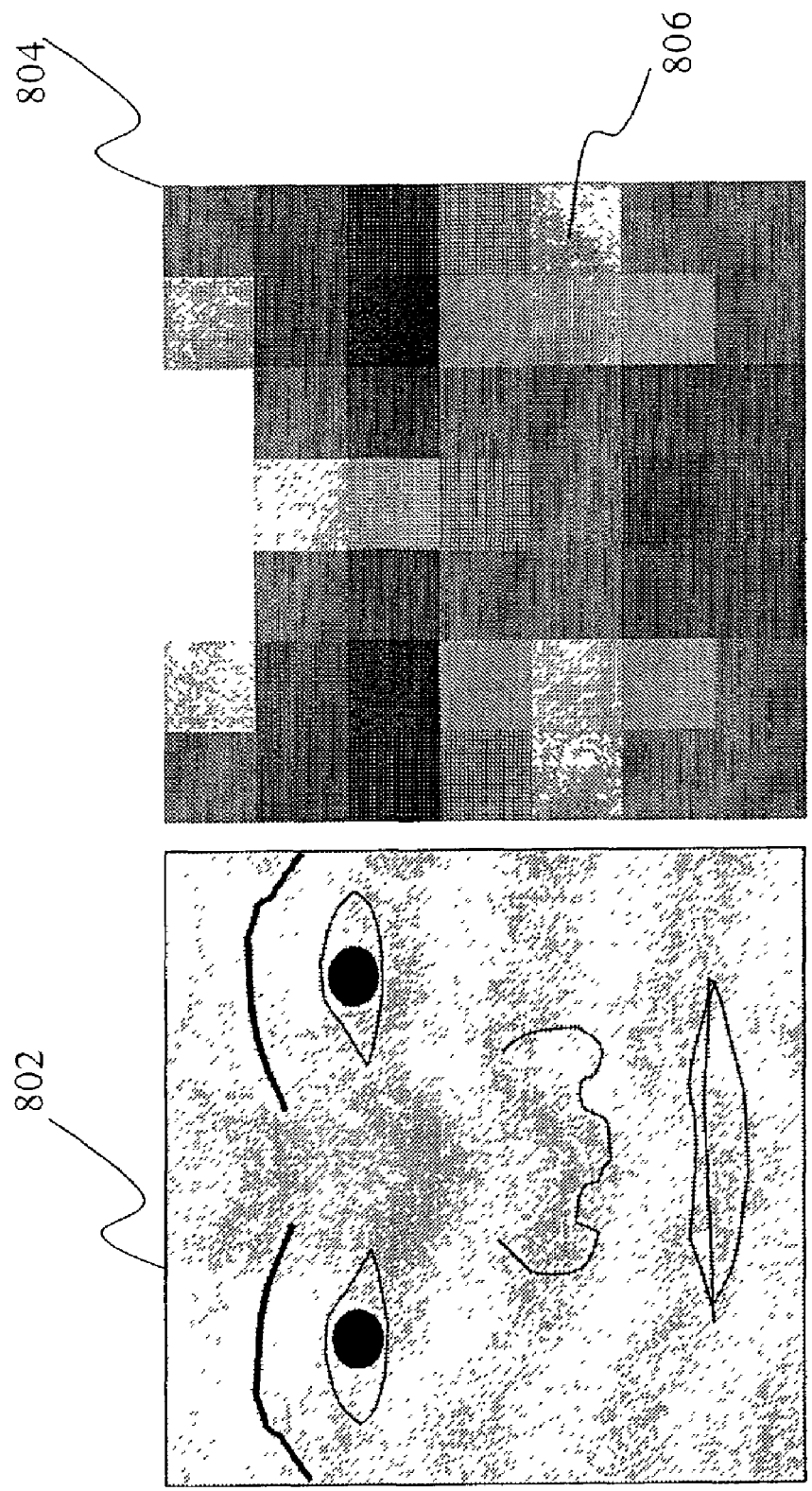
FIG. 8 is an illustration of an intensity face image and its regular grid pattern image.

Referring now to FIG. 3B, there is a flowchart describing design 2 for generating an MGPe image. A first step in design 2 is a step of collecting sample face images 372 in FIG. 3B. A large amount of cropped face images are manually collected. In getting a mean face image step 374, a mean face image is obtained by aligning two eyes of all the collected face images and taking average intensity for every pixel. To generate an MGPe image, grid cell sizes and positions have to be determined. In design 2, all cells have the same size. The design starts at a step of computing a distance, $e_1$ (608 in a face image 602 in FIG. 6), between two eye centers 376. It then finds the center position, c (706 in a face image 702 in FIG. 7), between the two eye centers in a step of computing a center position 378. The distance, $e_1$ (608), and center position, c (706), are used in a step of using distance, $e_1$, and center position, c to define a region containing M×N cells each of which has m×n pixels 380. Denote a unit distance by u. Let $u=e_1/f$. A preferred value of f is 8. In FIG. 7, starting from the center, c (706) there are four arrows (arrow 704, arrow 708, arrow 710 and arrow 712) pointing east, west, north and south respectively. Tips of the arrows define boundaries of a box to be used to crop the mean face image in order to compute the MGPe image. As shown in FIG. 7, the upper boundary is $(M-\delta_1)$ units (u) away from the center c, the lower boundary is $(M+\delta_2)$ units (u) away from the center, left boundary is N units (u) away from the center, and right boundary is N units (u) away from the center. Note that the physical length of unit u depends on the size of the mean face image. An exemplary value for M is 7, for N is 7, for $\delta_1$ is 2, and for $\delta_2$ is 2. In this case, as shown in FIG. 8, the design of the face grid pattern image 804 has square cells (such as cell 806) all having a same size and a square cropping region used in a step of cropping a sub-image 382 (see the cropped sub-image 802 from the mean face image shown in FIG. 8).

For design 2, positions of four corners of a cell 506 can be easily calculated with respect to the upper left corner of the sub-image in a step of determining four corner positions step 384. After getting corner positions for all cells, for design 2, subsequent steps (step of generating an integral image 386, step of computing a mean grid pattern image 388 and step of generating a mean grid pattern element image 390) are very much the same as that in design 1.

It is understood again that since the mean grid pattern element (MGPe) image takes only one pixel from each of the cells, statistically, the size of the cropped sub-image (thereby, size of individual cells) should not matter. The MGPe image is simply a statistical measure of main features of a mean face. Practically, an exemplary size for the cropped sub-image for design 2 could be 105×105 with 7×7 cells each of which has 15×15 pixels. Thereby, the mean grid pattern element (MGPe) image has 49 elements.

Before referring back to FIG. 4, the use of the MGPe image needs to be discussed. From the previous discussions, it is known that an MGPe image gathers the statistical information (structural information and intensity information) of a mean face region. To localize a face in an image, a type of measure has to be determined. In the present invention, a statistics, correlation coefficient (see "The Statistical Analysis of Time Series" by T. W. Anderson, John Wiley & Sons, Inc, 1994, chapter 6, entitled Serial Correlation, pp. 254–357, which is incorporated herein by reference), of two variables is used for classifying faces or non-face objects. The two variables here are a mean grid pattern element (MGPe) image and a grid pattern element (GPe) image of an image under testing. The GPe image should have the same size as the MGPe image.

Denote the MGPe image by $\Phi_0$ and the GPe image by $\Phi_1$. The correlation coefficient between these two variables is $$r = \mu_{11}/\sigma_{\Phi_i}\sigma_{\Phi_j} ||r| \leq 1 \quad \text{where} \tag{4}$$

$$\mu_{11}=E\{\Phi_i\Phi_j\}-E\{\Phi_i\}E\{\Phi_j\}$$

$$\sigma_{\Phi_k}=E\{(\Phi k-E\{\Phi_k\})^2\} \tag{5}$$

here E { } is an expectation operator.

To use the correlation coefficient, r, as a statistical measure to separate non-face objects and faces, distributions of the correlation coefficients between MPGe of the mean face and GPe of faces and the correlation coefficients between MPGe of the mean face and GPe of non-face objects are inspected.

Figure 9:
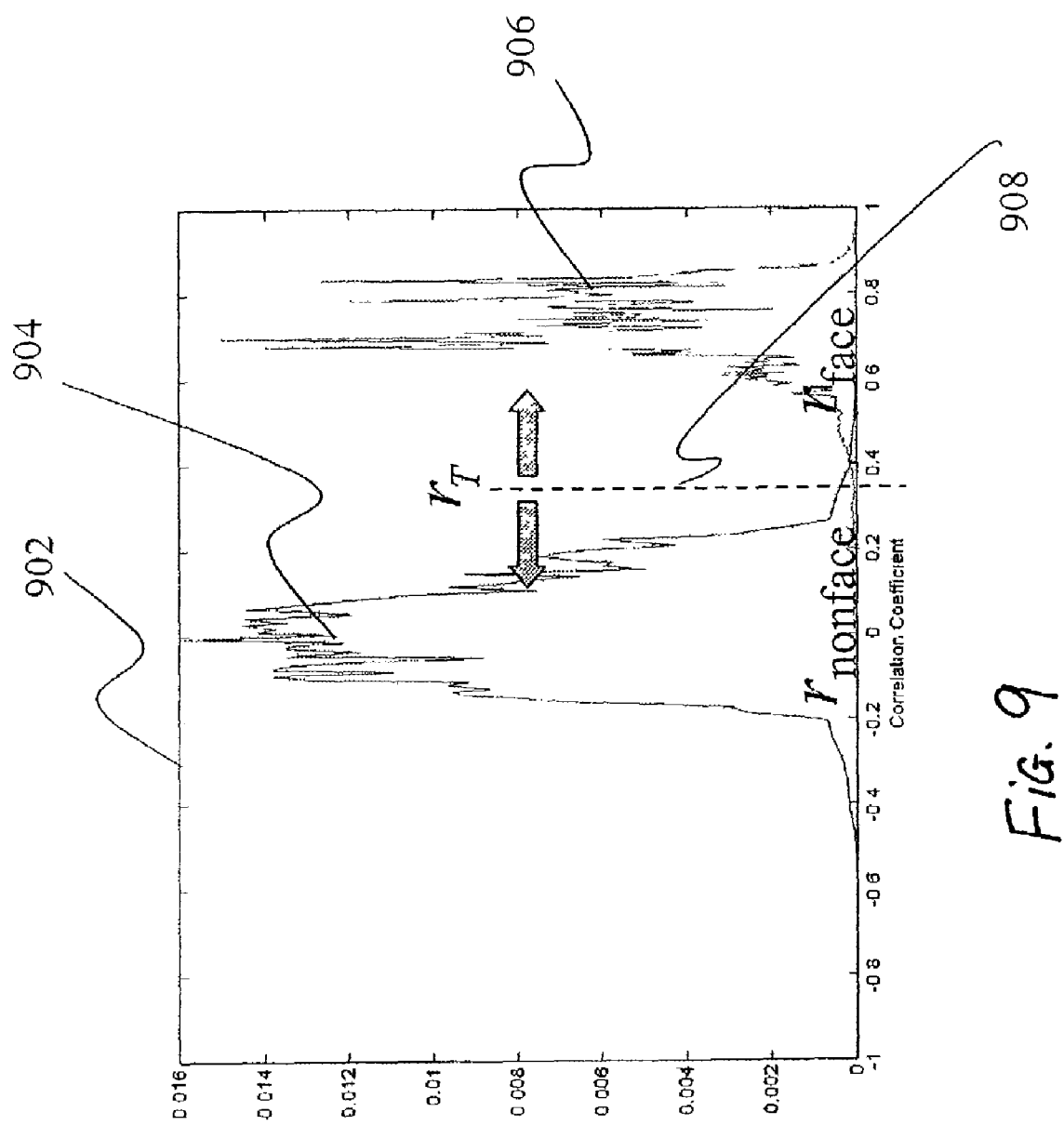
FIG. 9 is a graph illustrating distributions of correlation coefficients for face grid pattern images and the mean face grid pattern image, and non-face grid pattern images and the mean face grid pattern image.
Figure 10:
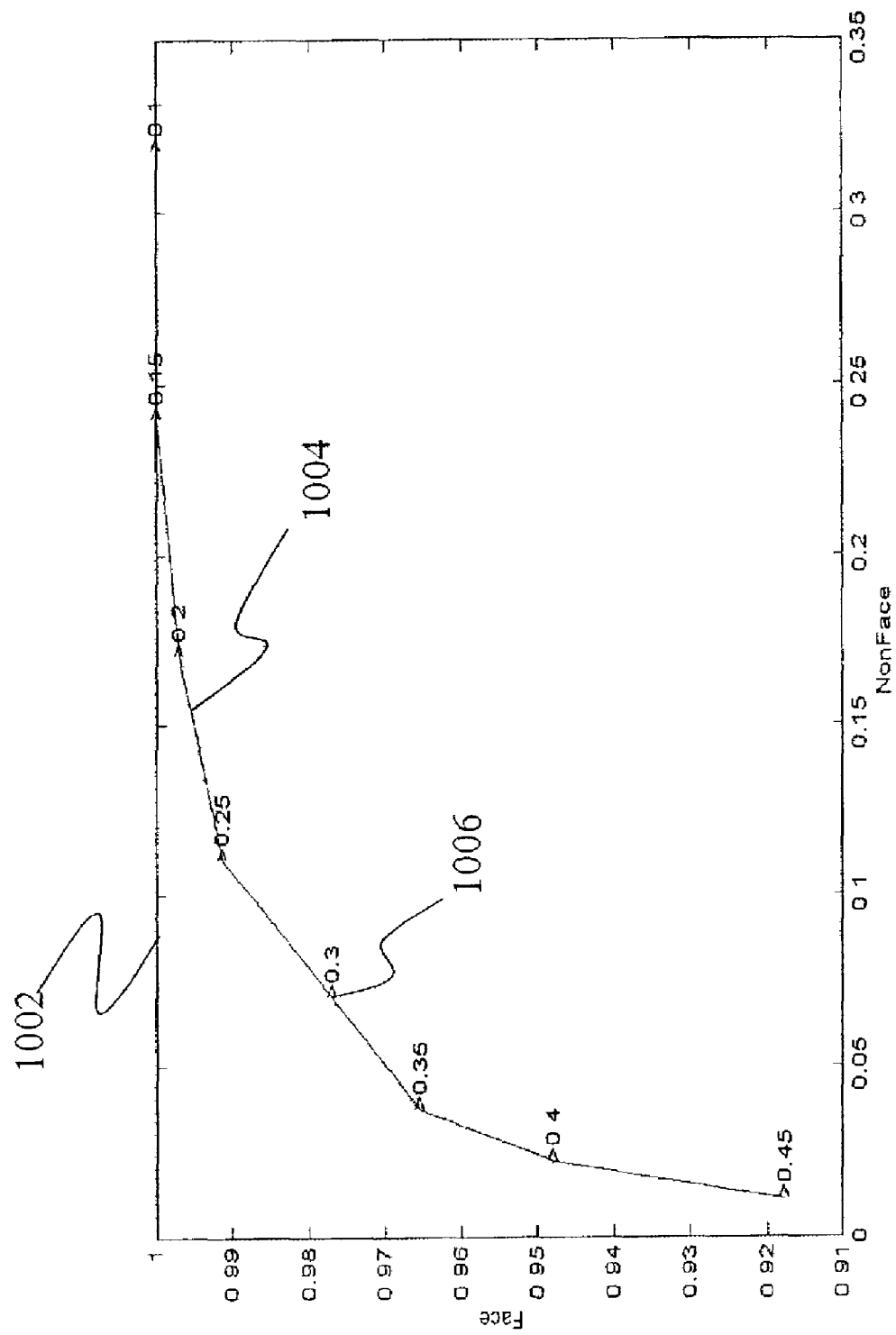
FIG. 10 is a graph illustrating face detection rates and false positive rates as functions of threshold values using the present invention.

A large number of sample faces are used to generate face grid pattern element (GPe) images using the method described in design 2 above (step 376 through step 390). Note that this time, GPe is generated for each individual sample face image, not for a mean image. After applying Equation (4) to the MGPe and each of the individual face GPes, a large number of correlation coefficients are produced. An example distribution of these coefficients is depicted in FIG. 9 by a curve 906 in chart 902. Noticeably, for face GPes, the correlation coefficients are mostly distributed between 0.4 to 1. The same procedures can be applied to a large number of non-face sample images. An example distribution of correlation coefficients between the MGPe and the non-face GPes is depicted in FIG. 9 by a curve 904 in chart 902. Noticeably, for non-face GPes, the correlation coefficients are mostly distributed below 0.4. Therefore, by changing a threshold, $r_T$ (908), a balanced true positive (correctly classified face) verses false positive (falsely classified face) performance is achievable. Chart 1002 in FIG. 10 shows a curve 1004 that depicts the performance of true positives verses false positives as a function of the threshold $r_T$(908). For example, a threshold value 0.3 (1006) confirms approximately 97.8% of the faces from the sample face set, while the same threshold falsely accepts roughly 6.2% of the non-faces from the non-face set as faces.

Referring back to FIG. 2, the step of grid pattern test 206 is detailed by steps from a step of cropping a sub-image 414 to a step of query 3 (430) in FIG. 4.

Recall that the parameters used in the cropping a sub-image step 414 are generated in a forming parameters sets list step 412. A set of parameters contains a width, a height, and positions of an upper left corner of a rectangular box. The width of the box is a maximum width of a cluster retained in the geometry test step 204. The height of the box is a maximum height of a cluster retained in the geometry test step 204. An example of such a box is a box 1248 shown in FIG. 12. The positions of the upper left corner of the box are defined with respect to the upper left corner of the binary image 1242. It should be understood that these parameters are re-scaled to fit the original image size before they are used to crop a sub-image from the gray scale image in the step of cropping a sub-image step 414.

For each set of parameters from the list, a sub-image is cropped from a gray image obtained from a step of converting gray image 411. Notice that this gray image has all but pixels retained in the step of erasing unwanted clusters 410 set to black. Remember, parameters from step 410 have to be rescaled before they can used in step 411. The gray image may have objects such as shown in example image 1242. An example set of parameters may crop a sub-image having the same size as box 1248. This sub-image has a cluster such as R12 (1246). This cluster has gray scale pixels. Pixels outside the cluster are black. With this sub-image, a corresponding integral image can be computed in a step of computing an integral image 416.

In a cropped sub-image, if there are any faces, their sizes are unknown. So, the search of faces starts with a maximum possible cell size (see a step of starting from an adequate grid pattern cell size 418) all the way down to a minimum allowable cell size (see a step of query 2 (428)). Suppose a 7×7 grid pattern element image (see 806 as an example) format is used for the face detection. Suppose the cropped sub-image has a size of 70×70. The maximum possible cell size is 10×10 in this case. The minimum allowable cell size is predefined. An exemplary minimum allowable cell size is 2×2. With this 70×70 sub-image, only one search can be conducted for a cell size of 10×10. That is because, for a 7×7 grid pattern element image, it needs a 70×70 region to support cells having a size of 10×10, while it only needs a 14×14 region to support cells having a size of 2×2. For the 70×70 sub-image, there will be 3249 searches for the minimum allowable cell size, if the search step size is 1. There also can be a predefined maximum allowable cell size. An exemplary maximum allowable cell size is 25×25. The difference between two consecutive cell sizes can be determined by a predefined scale factor. An exemplary scale factor could be $2^{1/8}$.

The grid pattern test basically correlates a type of MGPe image to a GPe image obtained from the test image. Recall that there are two types of MGPe. An irregular MGPe image (from design 1) and a regular MGPe image (from design 2).

If an irregular MPGe is selected, starting with maximum possible cell sizes, a step of scanning the current sub-image 420 crops a patch of the integral image computed from the cropped sub-image in step 416. Step 420 then uses the patch of the integral image and the irregular grid pattern type for computing the MGPe to compute a grid pattern element (GPe) image. In a step of grid pattern testing 422, a test is performed to see if a patch of the sub-image image corresponding to the cropped integral image patch represents a face by evaluating a correlation coefficient of the GPe and the MGPe. If the GPe computed from the cropped integral image patch passes the grid pattern test (that is, the correlation coefficient is greater than a predefined threshold, $r_T$ (908)), the position and size parameters of the current patch are stored in a face candidates list in a step of condition check 424.

If a regular grid pattern is selected, starting with a maximum possible cell size, a step of scanning the current sub-image 420 uses the integral image and the regular grid pattern type used for computing MGPe to compute a grid pattern element, (GPe) image with the selected cell size for the cropped sub-image. Step 420 then crops a patch of the GPe image such that the patch has the same size of the MGPe image. In a step of grid pattern testing 422, a test is performed to see if a patch of the sub-image corresponding to the cropped GPe patch represents a face by evaluating a correlation coefficient of the GPe and the MGPe. If the GPe patch cropped from the GPe image passes the grid pattern test (that is, the correlation coefficient is greater than a predefined threshold, $r_T$ (908)), the position and size parameters of the current patch are stored in a face candidates list in a step of condition check 424.

The above described grid pattern test is performed for all areas within a cropped sub-image (see step of query 1 (426)), for all adequate cell sizes (see step of query 2 (428)), and for all parameter sets (see step of query 3 (430)).

Figure 13:
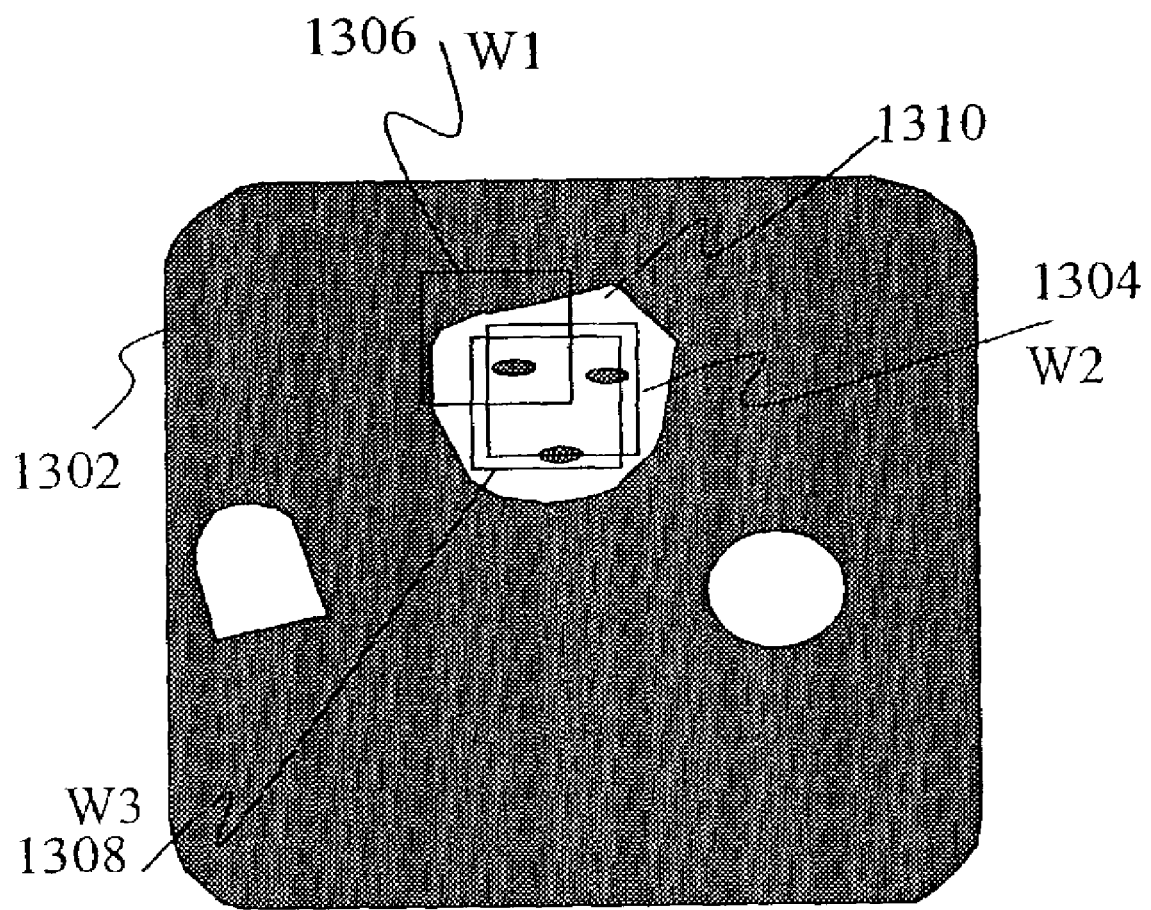
FIG. 13 is an illustration useful in describing a location test and post-test processing.

After having a list of face candidates, a step of location testing 432 tests the face candidate areas defined by the stored parameters. The said testing removes a set of parameters from the face candidates list if the area defined by the said set of parameters contains less than a predefined percentage of a cluster retained in step 410. An exemplary candidate to be removed is shown in FIG. 13. Candidate W1 (1306) partially covers a face area, so it is removed from the candidate list.

A final step of post-test processing 434 updates the face candidates parameters list revised in step 432 by merging neighboring candidates based on a distance measure of the centers of the candidate areas. Exemplary candidates W2 (1304) and W3 (1308) in cluster R3 (1310) of the location test image (1302) in FIG. 13 are close to each other, so they are to be merged. An exemplary distance measure is a Euclidean distance of one half of the average of the box (candidate areas) heights.

The subject matter of the present invention relates to digital image understanding technology, which is understood to mean technology that digitally processes a digital image to recognize and thereby assign useful meaning to human understandable objects, attributes or conditions, and then to utilize the results obtained in the further processing of the digital image.

The invention has been described with reference to a preferred embodiment. However, it will be appreciated that variations and modifications can be effected by a person of ordinary skill in the art without departing from the scope of the invention.

| PARTS LIST |
| --- |
| 100 image source |
| 102 image processor |
| 104 image display |
| 106 data and command entry device |
| 107 computer readable storage medium |
| 108 data and command control device |
| 109 output device |
| 202 chromaticity test |
| 204 geometry test |
| 206 grid pattern test |
| 208 location test |
| 210 post-test processing |
| 212 mean grid pattern element image generator |
| 304 collecting sample face images |
| 306 getting a mean face image |
| 308 determining individual cells covering local facial features |
| 310 determining a region containing all cells |
| 312 roping a sub-image from the mean face image using the determined region position and size |
| 314 determining four corner positions for all cells in the cropped box |
| 316 generating an integral image with cropped sub-image |
| 318 computing a mean grid pattern image using cell corner positions in the integral image |
| 320 generating a mean grid pattern element image |
| 372 collecting sample face images |
| 374 getting a mean face image |
| 376 computing a distance, $e_1$, between two eye centers |
| 378 computing a center position, c, between two eye centers |
| 380 using c and $e_1$ to define a region containing M×N cells each of which has m×n pixels |
| 382 cropping a sub-image from the mean face image using the determined region position and size |
| 384 determining four corner positions of all cells in the cropped sub-image |

-continued

PARTS LIST 386 generating an integral image with the cropped sub-image
388 computing a mean grid pattern image using cell corner positions in the integral image
390 generating a mean grid pattern element image
402 resizing image down
404 erasing non-skin-color pixels
406 clustering remaining pixels into clusters
408 morphological process
410 erasing unwanted clusters
411 converting to gray image
412 forming a parameters sets list
414 cropping a sub-image using a set of parameters
416 computing an integral image using the sub-image
418 starting from an adequate grid pattern cell size
420 scanning the current sub-image and obtain grid pattern element images using the integral image
422 grid pattern test using mean grid pattern element image
424 condition check
426 query 1
428 query 2
430 query 3
432 location test
434 post-test processing
502 face image
504 corner
506 cell
508 cluster boundary
602 face image
608 distance
702 face image
704 distance
706 center position
708 distance
710 distance
712 distance
802 face intensity image
804 face MxN grid pattern image
806 grid cell
902 chart
904 distribution curve
906 distribution curve
908 threshold
1002 chart
1004 curve
1006 number
1102 face image
1104 region
1106 corner position
1108 corner position
1110 corner position
1112 corner position
1114 corner position
1116 cell
1120 pixel
1122 integral image
1126 position
1128 position
1130 position
1132 position
1134 position
1202 intensity image
1212 first binary image
1216 cluster R1
1218 cluster R2
1220 cluster R3
1232 second binary image
1234 cluster R11
1236 cluster R12
1238 cluster R2
1240 cluster R4
1242 third binary image
1244 cluster R3
1246 cluster R12
1248 box
1302 location test image
1304 box W2
1306 box W1

-continued

PARTS LIST 1308 box W3
1310 cluster R3

What is claimed is:

1. A digital image processing method for locating faces in a digital color image, comprising the steps of:
   generating an integral image from the digital color image;
   generating a grid pattern image from said integral image, said grid pattern image having a grid pattern having a plurality of cells each of said cells having a plurality of pixels;
   reducing said grid pattern image to a corresponding grid pattern element image, said grid pattern element image having a number of pixels equal to the number of cells in said grid pattern image; and
   performing a correlation test between said grid pattern element image and a predetermined mean grid pattern element image of sample face images.

2. The method claimed in claim 1 wherein said generating an integral image step further comprises:
   cropping a sub-image from said digital color image; and
   computing said integral image from said sub-image.

3. The method claimed in claim 2 wherein said grid pattern has a first cell size and the method further comprises iterating said generating of said grid pattern image, said reducing, and said performing steps with each of a plurality of additional grid patterns, said grid patterns all having different cell sizes.

4. The method claimed in claim 3 wherein said digital color image has a plurality of different areas, said sub-image is of one of said areas; and the method further comprises repeating said generating, generating, reducing, performing, and iterating steps on a plurality of different additional sub-images of said digital color image.

5. The method claimed in claim 1, wherein the step of generating the integral image further comprises the steps of:
   replacing non-skin-color pixels with black to produce an image C having skin color pixels;
   replacing non face shaped clusters with black to produce an image E having skin colored face shaped clusters;
   labeling clusters of skin colored face shaped clusters; and
   generating the integral image from each cluster of the image E.

6. The method claimed in claim 5, wherein the step of replacing non face shaped clusters comprises the steps of:
   clustering skin-color pixels in image C into clusters;
   applying morphological opening and closing processes to skin-colored pixel clusters; and
   replacing the pixels of a cluster with black if it does not meet a geometrical criterion for a face, resulting in an image E; and wherein the step of labeling skin colored clusters comprises the step of generating a linked list of sets of parameters including a starting position, width, and height, that defines regions containing a cluster of skin-colored pixels.

7. The method as claimed in claim 5, wherein the step of selecting an irregular grid pattern comprises determining a plurality of different size grid cells that cover major features including eyes, nose, mouth, forehead, and cheek of the mean face image.

8. The method claimed in claim 1 further comprising prior to said generating steps:

generating a mean face image from a collection of sample face images;

generating a mean integral image from the mean face image;

generating a mean grid pattern image from said mean integral image, said mean grid pattern image having a plurality of cells in said grid pattern; and reducing said mean grid pattern image to a corresponding mean grid pattern element image, said mean grid pattern element image having a number of pixels equal to the number of cells in said mean grid pattern image.

9. The method claimed in claim 8 wherein said grid pattern element images and said mean grid pattern element image are one-dimensional.

10. The method claimed in claim 8, wherein the grid pattern is regular.

11. The method, claimed in claim 10, wherein the step of selecting a regular grid pattern comprises:

computing a distance, e1, between two eye centers of the mean face image;

computing a center position, c, between two eye centers; and using e1 and c to determine a region (position and size) that contains M by N grid cells with each cell having m by n pixels.

12. The method claimed in claim 8, wherein the grid pattern is irregular.

13. The method claimed in claim 8, wherein the step of generating the mean integral image further comprises the steps of:

replacing non-skin-color pixels with black to produce an image C having skin color pixels;

replacing non face shaped clusters with black to produce an image E having skin colored face shaped clusters;

labeling clusters of skin colored face shaped clusters; and generating the mean integral image from each cluster of the image E.

14. The method claimed in claim 13, further comprising the steps of:

eliminating faces that contain more than a predetermined percentage of black pixels; and merging faces that substantially overlap.

15. The method claimed in claim 13, wherein the step of replacing non face shaped clusters comprises the steps of:

clustering skin-color pixels in image C into clusters;

applying morphological opening and closing processes to skin-colored pixel clusters; and replacing the pixels of a cluster with black if it does not meet a geometrical criterion for a face, resulting in an image E; and wherein the step of labeling skin colored clusters comprises the step of generating a linked list of sets of parameters including a starting position, width, and height, that defines regions containing a cluster of skin-colored pixels.

16. The method claimed in claim 1, wherein the grid pattern is regular.

17. The method claimed in claim 1, wherein the grid pattern is irregular.

18. A computer program product for performing the method of claim 1, the computer program product comprising computer readable storage medium having a computer program stored thereon.

19. A digital image processing method for locating faces in a digital color image, comprising the steps of:

a) generating a mean arid pattern element (MGPe) image from a plurality of sample face images;

b) generating an integral image from the digital color image; and c) locating faces in the digital color image by using the integral image to perform a correlation test between the mean grid pattern element (MGPe) image and the digital color image at a plurality of effective resolutions by reducing the digital color image to a plurality of arid pattern element images (GPes) at different effective resolutions and correlating the MGPe with the GPes;

wherein the step of generating a mean arid pattern element (MGPe) image, comprises the steps of:

a1) collecting sample face images;

a2) generating a mean face image from the sample face images;

a3) selecting a arid pattern (GP); and a4) reducing the resolution of the mean face image to the resolution of the selected arid pattern (GP) by averaging;

wherein the arid pattern is regular; and wherein the step of selecting a regular grid pattern comprises computing a distance, e1, between two eye centers of the mean face image; computing a center position, c, between two eye centers; using e1 and c to determine M and N dimensions and a position of a region wherein said region contains M by N grid cells with each cell having m by n pixels.

20. A digital image processing method for locating faces in a digital color image, comprising the steps of:

a) generating a mean grid pattern element (MGPe) image from a plurality of sample face images;

b) generating an integral image from the digital color image; and c) locating faces in the digital color image by using the integral image to perform a correlation test between the mean grid pattern element (MGPe) image and the digital color image at a plurality of effective resolutions by reducing the digital color image to a plurality of grid pattern element images (GPes) at different effective resolutions and correlating the MGPe with the GPes;

wherein the step of generating an integral image further comprises the steps of:

b1) replacing non-skin-color pixels with black to produce an image C having skin color pixels;

b2) replacing non face shaped clusters with black to produce an image E having skin colored face shaped clusters;

b3) labeling clusters of skin colored face shaped clusters; and b4) generating the integral image from each cluster of the image E.

21. The method claimed in claim 20, further comprising the steps of:

d) eliminating faces that contain more than a predetermined percentage of black pixels; and e) merging faces that substantially overlap.

22. The method claimed in claim 20, wherein the step of replacing non face shaped clusters comprises the steps of:

b2.1) clustering skin-color pixels in image C into clusters;

b2.2) applying morphological opening and closing processes to skin-colored pixel clusters; and b2.3) replacing the pixels of a cluster with black if it does not meet a geometrical criterion for a face, resulting in an image E; and wherein the step of labeling skin colored clusters comprises the step of generating a linked list of sets of parameters including a starting position, width, and height, that defines regions containing a cluster of skin-colored pixels.

23. A digital image processing system for locating faces in a digital color image comprising:

means for generating an integral image from the digital color image;

means for generating a grid pattern image from said integral image, said grid pattern image having a grid pattern having a plurality of cells;

means for reducing said grid pattern image to a corresponding grid pattern element image, said grid pattern element image having a number of pixels equal to the number of cells in said grid pattern image; and means for performing a correlation test between said grid pattern element image and a predetermined mean grid pattern element image of sample face images.

* * * * *

UNITED STATES PATENT AND TRADEMARK OFFICE
CERTIFICATE OF CORRECTION

PATENT NO. : 7,110,575 B2 Page 1 of 1
APPLICATION NO. : 10/211011
DATED : September 19, 2006
INVENTOR(S) : Shoupu Chen et al.

It is certified that error appears in the above-identified patent and that said Letters Patent is hereby corrected as shown below:

| | |
|---|---|
| Column 16, Line 7, Claim 19 | Replace "arid" with --grid-- |
| Column 16, Line 10, Claim 19 | Replace "arid" with --grid-- |
| Column 16, Line 15, Claim 19 | Replace "arid" with --grid-- |
| Column 16, Line17, Claim 19 | Replace "arid" with --grid-- |
| Column 16, Line19, Claim 19 | Replace "arid" with --grid-- |
| Column 16, Line 24, Claim 19 | After "determine" insert --a region (position and size) that contains M by N grid cells with each cell having m by n pixels to using el and c to determine-- |

Signed and Sealed this

Second Day of January, 2007

JON W. DUDAS
*Director of the United States Patent and Trademark Office*